United States Patent
Weber et al.

(10) Patent No.: US 6,874,279 B1
(45) Date of Patent: Apr. 5, 2005

(54) WINDOW LIFTER WITH GUIDE RAIL FORMED FROM CARRIER PLATE

(75) Inventors: Horst Weber, Wirsberg (DE); Gerhard Hofmann, Untersiemau (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 62 days.

(21) Appl. No.: 10/088,450

(22) PCT Filed: Sep. 1, 2000

(86) PCT No.: PCT/DE00/03052

§ 371 (c)(1),
(2), (4) Date: Mar. 14, 2002

(87) PCT Pub. No.: WO01/20114

PCT Pub. Date: Mar. 22, 2001

(30) Foreign Application Priority Data

Sep. 14, 1999 (DE) ......................... 199 44 916

(51) Int. Cl.⁷ ............................................... E05F 11/48
(52) U.S. Cl. ............................ 49/352; 49/348; 49/459; 49/502
(58) Field of Search .................... 49/348, 349, 352, 49/424, 459, 502; 411/501, 504; 29/509, 512, 421.1; 312/334.31; 104/206

(56) References Cited

U.S. PATENT DOCUMENTS

| | | | | |
|---|---|---|---|---|
| 4,428,157 A | * | 1/1984 | Engelsberger et al. | 49/502 |
| 4,434,580 A | * | 3/1984 | Engelsberger et al. | 49/502 |
| 4,502,247 A | * | 3/1985 | Kobayashi et al. | 49/352 |
| 4,700,508 A | * | 10/1987 | Kollner et al. | 49/352 |
| 5,058,322 A | | 10/1991 | Sambor | |
| 6,161,337 A | * | 12/2000 | Morando | 49/352 |

FOREIGN PATENT DOCUMENTS

| | | |
|---|---|---|
| DE | 36 37 961 C1 | 7/1987 |
| FR | 2 768 765 A3 | 3/1999 |
| WO | WO 98/50658 | 11/1998 |

OTHER PUBLICATIONS

International Search Report of PCT/DE00/03052, dated Jan. 16, 2001.
International Preliminary Examination Report of PCT/DE00/03052, dated Nov. 22, 2001.
English translation of International Preliminary Examination Report for corresponding International Application PCT/DE00/03052.

* cited by examiner

Primary Examiner—Gregory J. Strimbu
(74) Attorney, Agent, or Firm—Christie, Parker and Hale, LLP

(57) ABSTRACT

A window lifter includes a rope or a Bowden cable and is used in motor vehicles. The window lifter also includes guide rails that are integrated into the base surface of a carrier plate of a motor vehicle door. The window lifter also includes carriers that can be displaced along the guide rails and receive a window pane as well as reversing devices that are arranged at the ends of the guide rails. The rope engages with the carriers and a drive device and is guided via the reversing devices. The guide rails protrude from the base surface of the carrier plate, have a slot that extends in the longitudinal direction and are covered on the open base side of the carrier plate in a dampproof manner. The carriers can be at least partially situated on the external and internal side of the guide rails and pass through the respective slot to engage with the rails.

22 Claims, 11 Drawing Sheets

WINDOW LIFTER WITH GUIDE RAIL FORMED FROM CARRIER PLATE

CROSS-REFERENCE TO RELATED APPLICATION

This application claims priority of International application number PCT/DE00/03052, filed Sep. 1, 2000, which in turn claims priority of German application number 199 44 916.3, filed Sep. 14, 1999.

FIELD OF INVENTION

The invention relates to a cable or Bowden cable window lifter for motor vehicles.

BACKGROUND

A cable or Bowden cable window lifter is known from WO 98/50658 and contains an stamped, more particularly deep-drawn, carrier plate with stamped guide rails for the carriers of a window pane. The stamped carrier plate consists of a deep-drawn sheet metal profiled section having several sections standing at angles to each other. Guide rails for the cable or Bowden cable window lifter are formed on the surface of the carrier plate by dish stamping or deep-drawing and serve at the same time to hold cable pulley rollers which are mounted on a support element.

Before fitting the support elements with the cable pulley rollers fixed thereon, the carriers are fitted onto the guide rails which are formed by dish stamping. The support elements are then pushed onto the ends of the stamped rails and the cable is placed around the cable guide pulleys and connected to the carriers. The carriers slide up or down on the guide rails depending on the pulling direction of the window lifter cable which is guided over the cable guide pulleys whereby if necessary cable mountings arranged on the cable guide pulleys serve to attach the Bowden cable sleeves. A motor-gear unit which is provided at a suitable stamped area with apertures on the carrier plate serves to drive the cable or Bowden cable window lifter.

From U.S. Pat. No. 5,058,322 a cable window lifter is known having a manual drive with a guide rail with a slot running in the longitudinal direction of the guide rail through which a carrier engages which bears against both sides of the slot of the guide rail. Upper and lower fixing plates are provided at the ends of the guide rail with the guide pulleys arranged thereon. The guide rail itself is formed as a shaped sheet metal part which is fixed together with the upper and lower fixing plate in a vehicle door.

SUMMARY OF THE INVENTION

The object of the present invention is to provide a cable or Bowden cable window lifter which ensures an exact geometric relationship between the individual parts of the window lifter in one manufacturing step, which allows simple manufacture and assembly as well as selectively a wet space design of a window lifter or wet and dry space separation of the window lifter with simple means and few manufacturing steps.

The solution according to the invention provides an exact geometric relationship and alignment of the guide rails, the carriers guided thereon and the window pane fixed in the carriers in one manufacturing step, a simple production and assembly of the window lifter as well as when required a wet space design of the window lifter or a wet/dry space separation of the window lifter with simple means and in few manufacturing steps.

Starting from the cable or Bowden cable window lifter known from WO 98/50658 and having guide rails stamped in the surfaces of a carrier plate, the idea of the present invention is to configure the guide rails and integrate them into the carrier plate so that both a wet space design and also a wet/dry space separation of a cable or Bowden cable window lifter are possible and can be manufactured with simple means. Furthermore the stamping of the carrier plate is to be carried out in only few and preferably in only one work step, and the cable guide should be possible both centrally and also eccentrically in relation to the carriers without the need for structural alterations to the guide rails.

By shaping the at least one guide rail out from the base surface of the carrier plate with a slot running in the longitudinal direction of the thus shaped guide rail whereby the carrier bears against the outside and inside of the slot and engages through the slot as well as through the moisture-proof cover of the open side of the guide rail which is shaped out from the base surface of the carrier plate or through the moisture-proof cover of the base surface itself, both an exact guide of the individual parts of the window lifter and also a readily producible wet/dry space separation of the window lifter is now possible.

By simply covering the curved guide rail in the region of the base surface of the carrier plate it is possible to separate the wet and dry space of the window lifter with the simplest means and to ensure simple assembly and adjustment of the window lifter as well as when required to allow easy access to the individual parts of the cable or Bowden cable window lifter for maintenance or repair purposes.

The cover for the guide rail for separating the wet and dry space can be formed flat and can be arranged in the plane of the base surface of the carrier plate or guide rail. A flat cover of this kind can consist in the simplest form of a permanent adhesive strip or an adhesive foil which is fixed on the edges of the carrier plate adjoining the guide rail which is shaped out of the base surface.

In another embodiment, the cover can be formed as a part of the door inside trim of the vehicle door, and can consist of a part which is shaped out correspondingly from the door inside trim and covers the guide rail which is shaped out of the base surface of the carrier plate. With this embodiment the number of parts is reduced and assembly costs are simplified.

Furthermore the cover can consist of a lining which is preferably formed from a foil or foam layer and serves as protection against corrosion or as sound insulation. The lining completely covers the carrier plate so that the cover fulfils a multi-functional purpose, namely that of separating the wet and dry space, guarding against corrosion and acting as sound insulation.

A further embodiment of the cover for the guide rail for separating the wet and dry space comprises a shaped part inserted in the inside of the guide rail so that this type of cover not only acts to separate the wet and dry space but also as a result of its mechanically stable shape can also fulfill stabilizing functions and where necessary support functions for the window lifter cable.

In order to support the window lifter cable the shaped part has a corresponding socket for the window lifter cable and is connected sufficiently securely to the carrier plate in which it is pushed for example in guide grooves of the carrier plate arranged at the side of the guide rail which is made out of the base surface, thereby producing a positive keyed connection with the carrier plate.

Furthermore there is the possibility of forming the carrier in one or more parts and of connecting the window lifter cable to the carrier so that it lies selectively inside the curvature or outside of the guide rail which is shaped out of the base surface of the carrier plate.

With a two-part design of the carrier the one part of the carrier lies against the outside of the guide rail and the other part of the carrier lies against the inside of the guide rail.

The carrier can be divided in the region of the cable nipple chamber and can have two openings above and below the cable nipple chamber to hold the counter member which forms the second part of the carrier and which preferably consists of a sheet metal angle with a plastics insert.

In a one-piece design the carrier has an oblong fixing or slide region which after pushing through the slot of the guide rail and turning about its transverse axis bears on the outside or inside against the edges which adjoin the slot of the guide rail. In this one-piece embodiment the carrier can be inserted in the guide rail anywhere along the guide slot and can be brought by turning about its transverse axis into engagement each side with the edges of the guide slot.

The window lifter cable can be connected centrally relative to the carrier to its cable nipple chamber. If the cable never passes through the plane of the carrier plate irrespective of the position of the carrier a simple flat adhesive foil can be used as the cover.

If the cable running between the reversing device intersects the base surface of the carrier plate at least at some points then the cover is formed so that it at no point contacts the cable. This can be achieved through configuring the cover to have a curved cross-section.

Shaping out function elements for devices in a vehicle door such as shaping out guide rails for cable or Bowden cable window lifters is not the only purpose of use. Thus a guide slot can be provided in the carrier plate or a guide part shaped out of the base surface of the support plate, through which a slide element or fixing part is pushed and thereby connected, where necessary displaceable, to the carrier plate. The slide element or fixing part can be connected to an arm rest of the vehicle door directly or through fixing elements. Through a corresponding cover of a guide slot of this kind or a guide element shaped out of the base surface it is possible to ensure the required separation of the wet and dry space in the vehicle door and in order to fit an armrest it is possible to make corrections to the positioning during or after assembly to ensure the optimum position of the arm rest.

The ramp-shaped design of the upper and lower end region of the guide rails, i.e. the continuous rise of the shaping or stamping of the guide rails out from the base surface of the carrier plate or the longitudinally curved formation of the guide rails ensures optimum cable guide and insertion into the reversing devices.

Shaping or stamping out the guide rail from the base surface of the carrier plate can be produced by deep drawing or by stamping a metal carrier plate or by injection moulding or thermo-shaping a plastics carrier plate.

In order also to ensure the wet and dry space separation in the side region of the carrier plate according to a further feature of the invention the side parts of the carrier plate are connected in moisture-proof manner to a carrier plate socket of the motor vehicle door.

BRIEF DESCRIPTION OF THE DRAWINGS

The idea on which the invention is based will now be explained with reference to the embodiments illustrated in the drawings in which.

DETAILED DESCRIPTION

Figure 1:
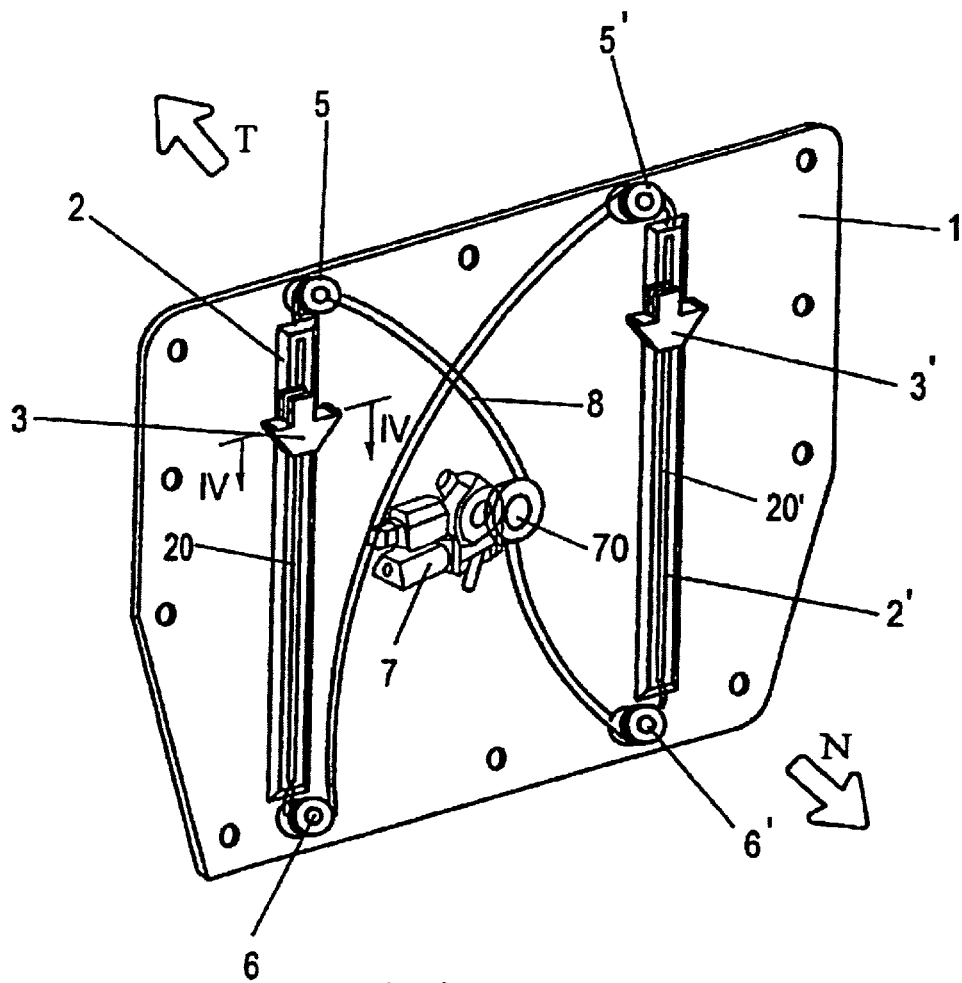
FIG. 1 shows a diagrammatic perspective view of an stamped or deep-drawn carrier plate having integrated guide rails for a single or dual strand cable or Bowden cable window lifter.

The carrier plate 1 illustrated in FIG. 1 has two guide rails 2, 2' which are shaped out from the base surface of the carrier plate 1 by stamping or deep drawing and on which carriers 3, 3' holding a window pane are mounted displaceable in the longitudinal direction of the guide rails 2, 2'. The carriers 3, 3' are connected to a cable 8 which is guided over cable guide pulleys 5, 5' in the region of the upper edge of the carrier plate 1 as well as cable guide pulleys 6, 6' in the region of the lower edge of the carrier plate 1. The cable is connected to a cable drum 70 which is driven by a motor gear unit 7.

The carriers 3, 3' are guided in a slot 20, 20' which is provided in the longitudinal direction of the stamped guide rails 2, 2' and—as will be explained in further detail below with reference to FIGS. 4 to 7—bear against both the outside and inside of the shaped area of the guide rails 2, 2'.

FIG. 1 shows a wet/dry space separation in the cable or Bowden cable window lifter since the moisture-sensitive motor gear unit 7 is mounted on the dry space side of the carrier plate 1 which is at the back in the viewing direction indicated by the arrow T, while the carriers 3, 3', the cable 8 and the cable drum 70 are provided on the wet space side which is indicated by arrow N and is located on the front side of the carrier plate 1 in the viewing direction. In order to separate the wet and dry spaces the cable drum 70 is connected to the motor gear unit 7 through a drive shaft which is pushed through a bore of the carrier plate 1, with the passage of the drive shaft through the carrier plate 1 being sealed off. As can already be seen from the arrangement of the individual parts of the cable or Bowden cable window lifter according to FIG. 1, the wet/dry space separation can be easily undertaken and guaranteed by simply covering the open base surface of the guide rails 2, 2' in the plane of the base surface of the carrier plate 1.

Through the one-piece embodiment with the guide rails 2, 2' shaped out of the base surface of the carrier plate 1 and integrated in said carrier plate 1 and with the resulting defined spacing between the two guide rails 2, 2' it is possible to observe very close tolerances during production in only one work step. Furthermore the proposed reinforcing stamped regions which can be seen from the illustration of the carrier plate 1 in FIGS. 2 and 3 enable an open system and in addition as a result of the strengthening achieved through the reinforcing stamped regions a lighter weight construction by using thinner materials while maintaining at the same time a high resistance to side impacts.

Figure 2:
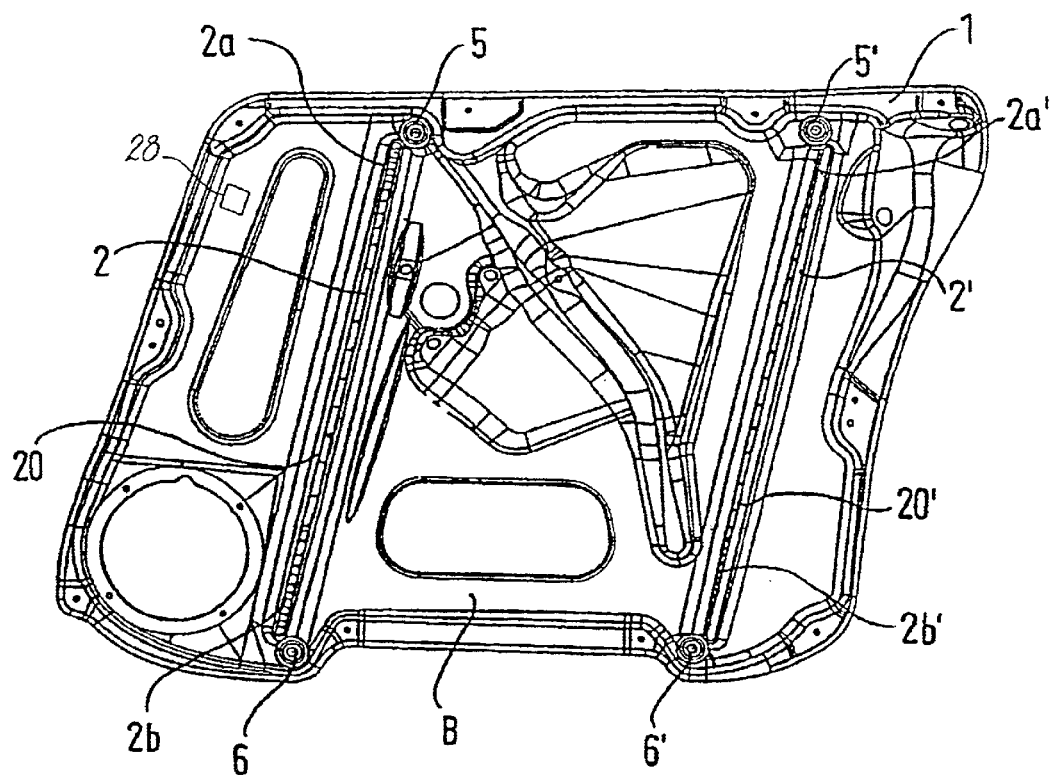
FIG. 2 is a front view of a carrier plate with integrated guide rails, cable guide pulleys, reinforcing stamped regions and socket openings for component parts of a motor vehicle door or a door module.
Figure 3:
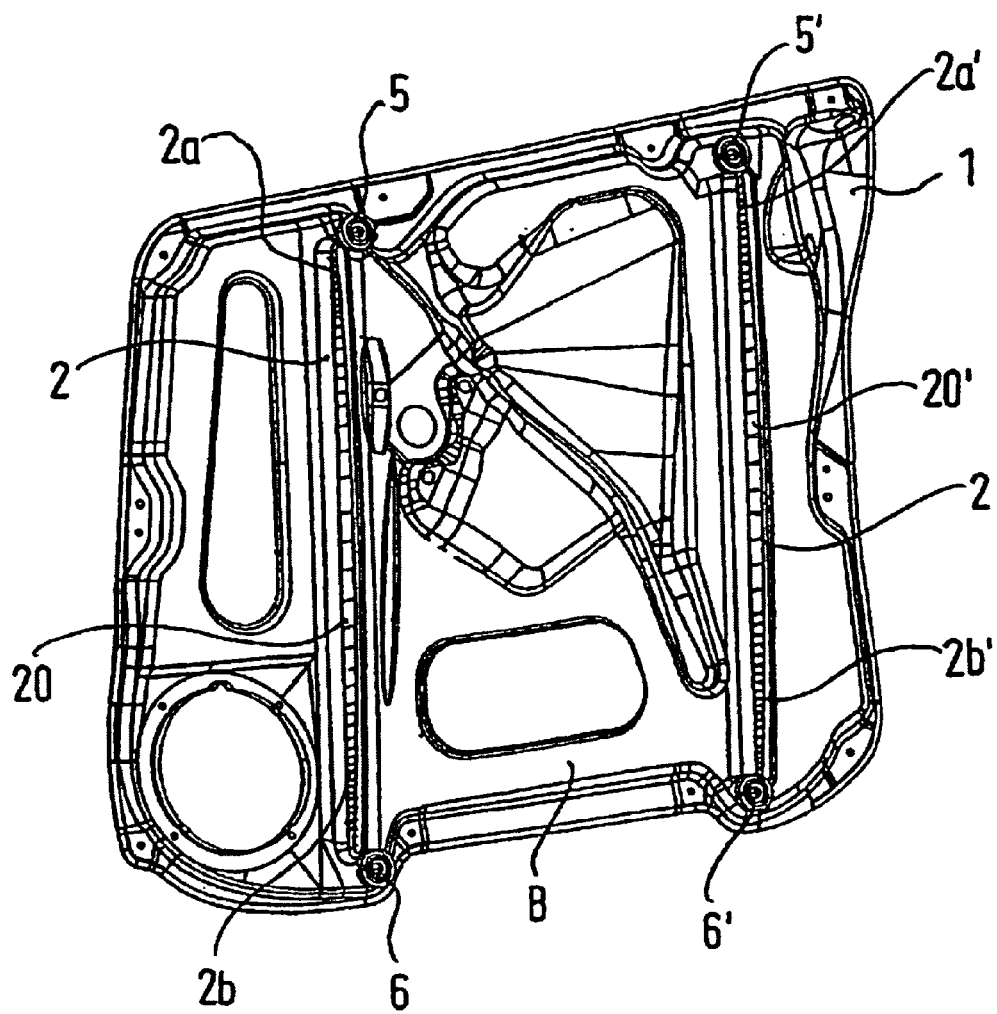
FIG. 3 is an inclined view of a carrier plate with integrated guide rails, cable guide pulleys, reinforcing stamped regions and socket openings for component parts of a motor vehicle door or a door module.

The stamped or deep-drawn carrier plate 1 illustrated in front view in FIG. 2 and in an inclined view in FIG. 3 shows the formation of the carrier plate 1 as well as the different regions of the material structure which are formed by stamping or deep-drawing the base surface B of the carrier plate 1.

The guide rails 2, 2' which are shaped out and have a slot 20, 20' running in the longitudinal direction thereof project out from the base surface B of the carrier plate 1. At the ends of the guide rails 2, 2' are the cable guide pulleys 5, 5' and 6, 6' which are arranged so that the cable is introduced into the slot 20, 20' and can be connected to the carriers (not shown) which are mounted displaceable in the longitudinal direction of the guide rails 2, 2' which are shaped out from the base surface of the carrier plate 1. The surface of the carrier plate 1 which is located between the guide rails 2, 2' is shaped so that the cable of the cable or Bowden cable window lifter runs above the surface of the carrier plate 1 without contacting the carrier plate 1 and can be connected to the cable drum (not shown here) of the motor gear unit of the cable or Bowden cable window lifter.

For the optimum cable guide the upper and lower end regions 2a, 2a', and 2b, 2b' of the guide rails 2, 2' which are shaped out from the base surface of the carrier plate 1 are formed like ramps, i.e. starting from their ends they rise in these end regions continuously up to the shaped height, which is indicated by the compaction of the cross lines in the slot 20 and 20' up to the change into the cable guide pulleys 5,5' and 6, 6'.

Alternatively the guide rails shaped out from the base surface of the carrier plate 1 can be curved in the longitudinal direction, which likewise ensures an optimum cable guide and insertion into the reversing devices.

The stamped regions which can be seen from the illustrations of the carrier plate 1 in FIGS. 2 and 3 show the structuring of the carrier plate 1 where despite the reduced material thickness of the carrier plate 1 it has optimum strength particularly in relation to side impact forces.

Different regions (not shown in further detail) of the carrier plate 1 serve to hold, fix or position door component parts such as speakers, lock systems or the like and the carrier plate can be provided with guide slots or guide elements 28 shaped out of the base surface of the carrier plate for engaging slide elements or fixing elements connected to structural parts of the door.

Figure 4:
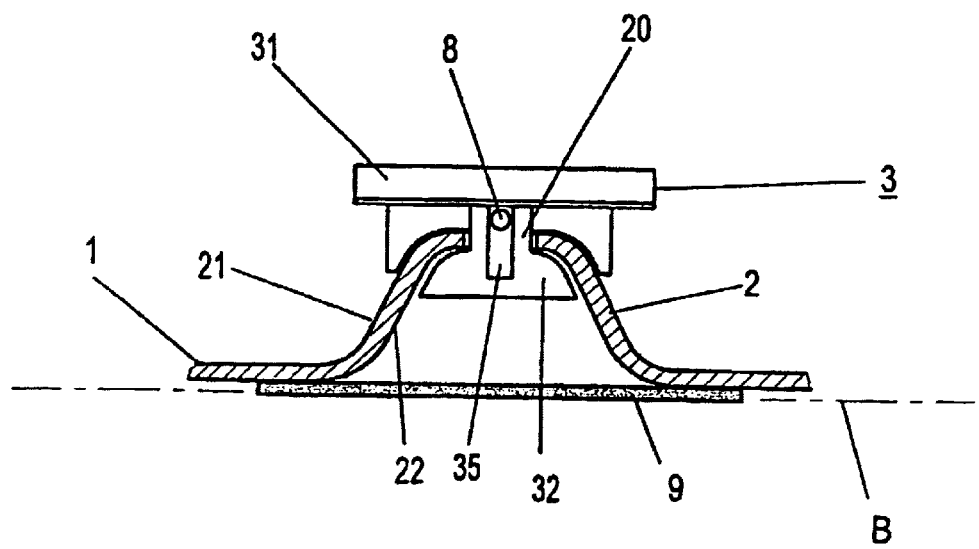
FIG. 4 shows a cross-sectional view through a guide rail shaped out of the base surface of the carrier plate and a two-part carrier connected to the guide rail.

FIG. 4 shows a cross-section through a guide rail 2 shaped from the base surface of the carrier plate 1 along the line IV—IV according to FIG. 1 with a slot 20 arranged in the apex of the shaped area and a two-part carrier 3 mounted on the arched guide rail 2 whereby the outer part 31 of this carrier bears against the outside 21 of the guide rail 2 and its inner part 32 bears against the inside 22 of the shaped area of the guide rail 2. A slot 35 in the outside and/or inside part 31, 32 of the two-part carrier 3 serves to receive and guide the cable 8 which is connected to the carrier 3 in a cable nipple chamber of said carrier 3.

A cover 9 is provided in the plane of the base surface B of the carrier plate 1 to separate the wet and dry space of the cable or Bowden cable window lifter. In the simplest case this cover can be a permanent adhesive strip of sufficient width which is stuck on the dry space side of the carrier plate 1 on the edges adjoining the guide rail 2 shaped out from the base surface of the carrier plate 1, thereby forming an effective moisture barrier in the region of the open base surface of the guide rail 2.

Figure 5:
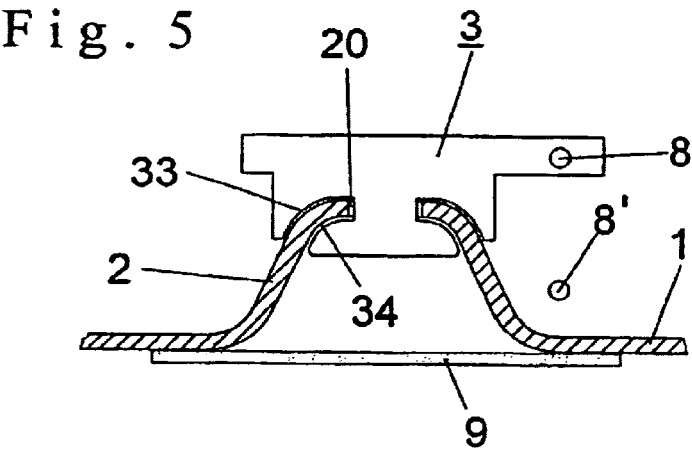
FIG. 5 shows a cross-sectional view through a guide rail shaped out of the base surface of the carrier plate and a single part carrier connected to the guide rail.

FIG. 5 shows a cross-section through a guide rail 2 shaped out from the base surface of the carrier plate 1 and having a slot 20 formed in the apex of the shaped area and running in the longitudinal direction of the guide rail 2 to hold a one-piece carrier 3. The one-piece carrier 3 is shaped so that one part 33 of the carrier 3 bears against the outside of the guide rail 2 whilst the other part bears against the inside of the guide rail 2.

The inner part 34 of the one-piece carrier 3 and/or the part of the one-piece carrier 3 engaging through the slot 20 is configured so that the one-piece carrier 3 can be snap-fitted through the slot 20 into the guide rail 2 from outside the said guide rail 2 which is shaped out from the base surface of the carrier plate 1. By way of example this can be achieved by suitably shaping the inside part 34 and by inserting the one-piece carrier 3 into the slot 20 and then turning the carrier 3. Alternatively the one-piece carrier 3 can be inserted inclined into the slot 20 and then through a subsequent tilting action can be connected with keyed engagement with the guide rail 2 where it is displaceable in the longitudinal direction of same.

As opposed to the two-part carrier 3 illustrated in FIG. 4 the one-piece carrier 3 illustrated in FIG. 5 has an eccentric fixing of the cable 8. The eccentric attachment of the cable to the carrier 3, unlike the central attachment of the cable, produces a tilting moment which during longitudinal displacement of the carrier 3 leads to a somewhat increased friction and thus to higher friction losses. These losses can however be minimised through suitably matching up the materials.

With a curved carrier plate 1 it should additionally be observed that the cable connected to the carrier 3 and guided over the cable guide pulleys 5 and 6 at the ends of the guide rail 2 which is shaped out from the base surface of the carrier plate 1 does not intersect the base surface of the carrier plate 1, i.e. there should be adequate distance between the cable guide and the carrier plate 1. This can be clearly seen in FIG. 5 through the cable marked by 8' in the case of a curved carrier plate 1.

Figure 6:
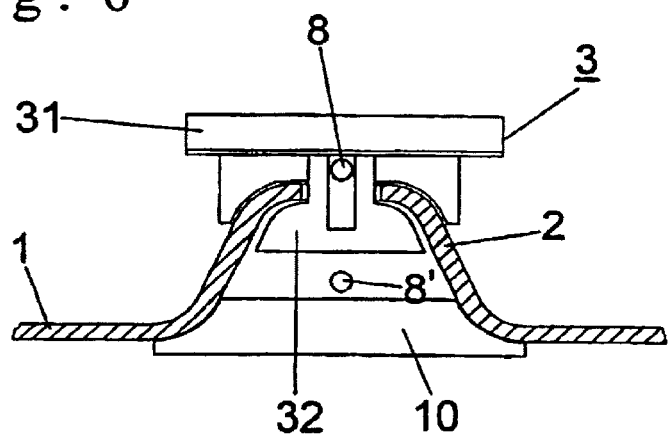
FIG. 6 shows a cross-sectional view through a guide rail shaped out of the base surface of the carrier plate and a two-part carrier connected to the guide rail.
Figure 7:
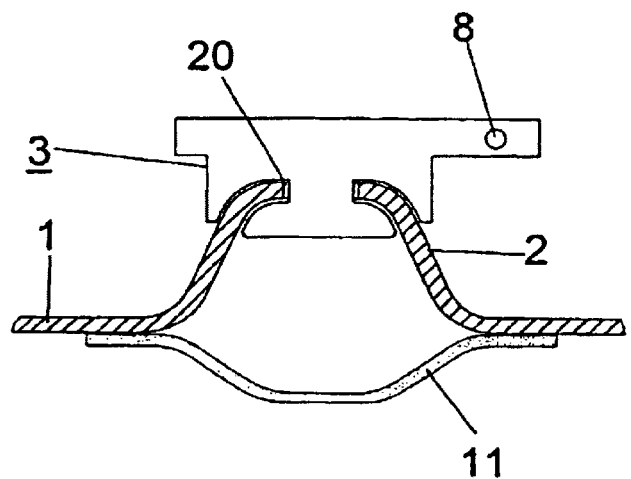
FIG. 7 shows a cross-sectional view through a guide rail shaped out of the base surface of the carrier plate and a single part carrier connected to the guide rail.

The arrangement illustrated in FIG. 5 likewise shows a wet and dry space separation by attaching a permanent adhesive strip 9 on the dry space side of the carrier plate 1 along the guide rail 2 which has been shaped out from the base surface of the carrier plate 1. For this type of wet/dry space separation it is possible to use in place of a simple permanent adhesive strip 9 also any other type of cover part. FIGS. 6 and 7 show in connection with a single or two-part carrier 3 different forms for covering the guide rail 2 shaped out of the base surface of the carrier plate 1 in order to separate the wet and dry space.

FIG. 6 shows a cover for the base of the guide rail in the region of the base surface of the carrier plate 1 using a shaped part 10 which is preferably made from plastics and is inserted in the guide rail 2 which is shaped out from the base surface of the carrier plate 1. This shaped part 10 can be inserted with force-locking or positive keyed engagement into the opening formed by the shaped areas of the guide rail 2.

FIG. 7 shows the possibility for separating the wet and dry space using a moulded plastics member 11 which bears against the side edges adjoining the opening of the guide rail 2 shaped out from the base surface of the carrier plate 1, and is connected by suitable means, for example by an adhesive or push-fit connection, with the dry space side of the carrier plate 1.

Figure 8:
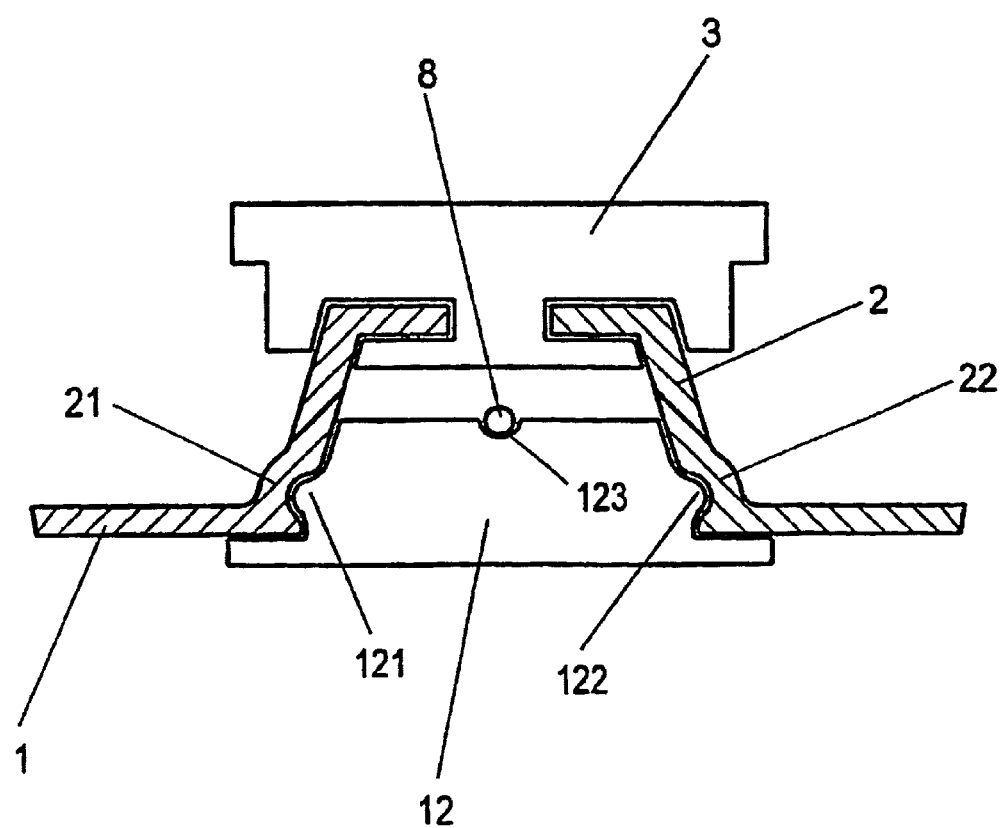
FIG. 8 shows a cross-sectional view through a guide rail shaped out from the base surface of a carrier plate and having side guide grooves and a cover connected with keyed engagement to the guide rail.
Figure 12:
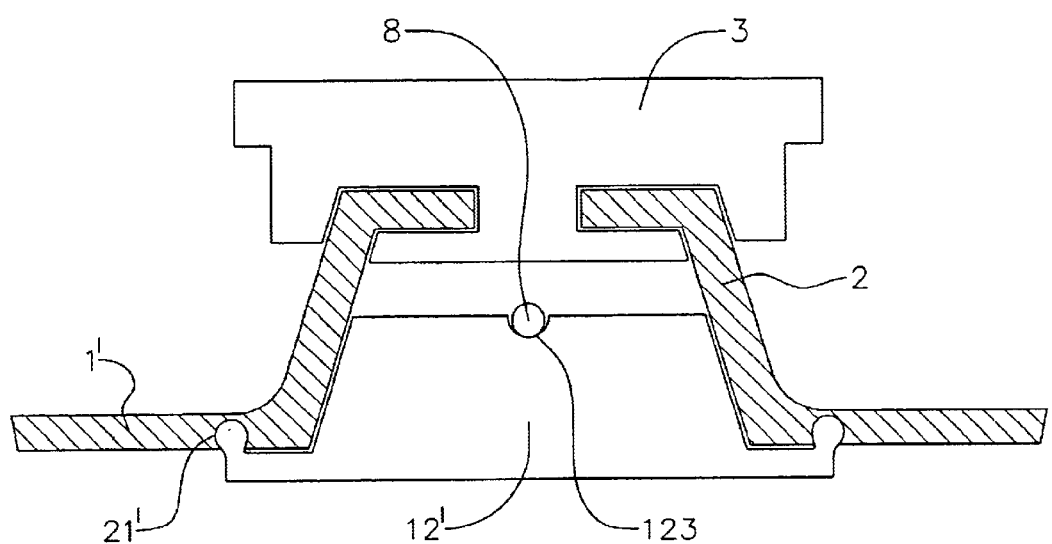
FIG. 12 shows a cross-sectional view through a guide rail shaped out from the base surface of a carrier plate and having grooves on the carrier plate.
Figure 13:
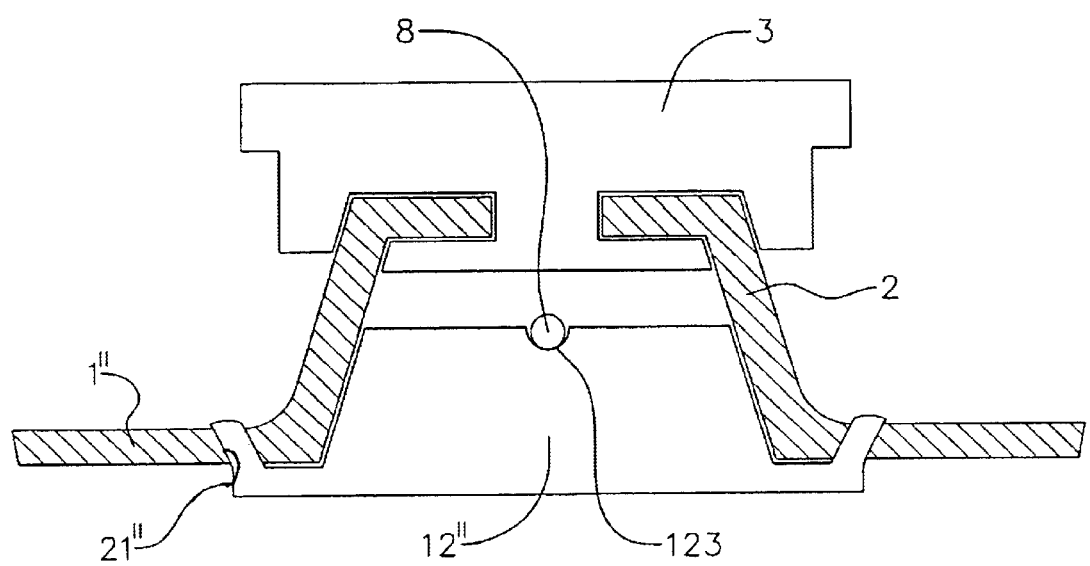
FIG. 13 shows a cross-sectional view through a guide rail shaped out from the base surface of a carrier plate and having slots on the carrier plate.
Figure 14:
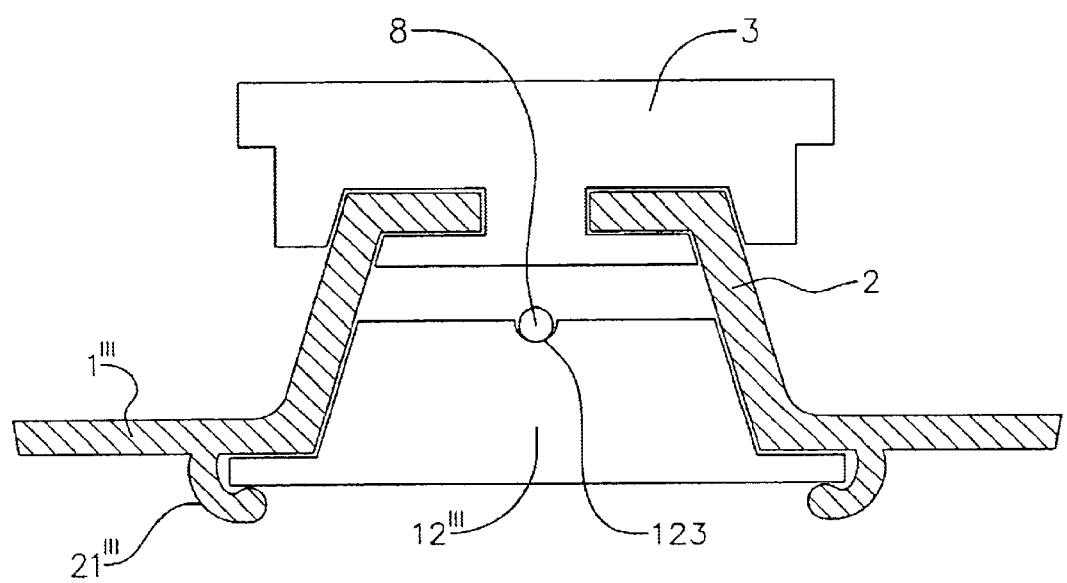
FIG. 14 shows a cross-sectional view through a guide rail shaped out from the base surface of a carrier plate and having hooks on the carrier plate.
Figure 1:
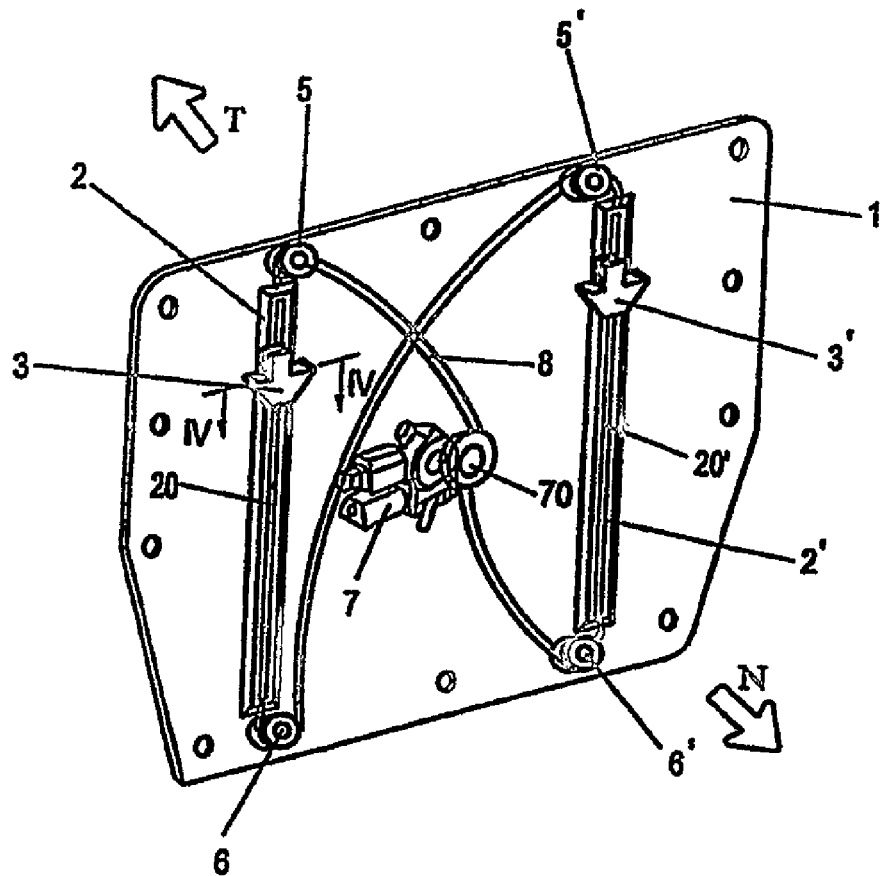
Figure 4:
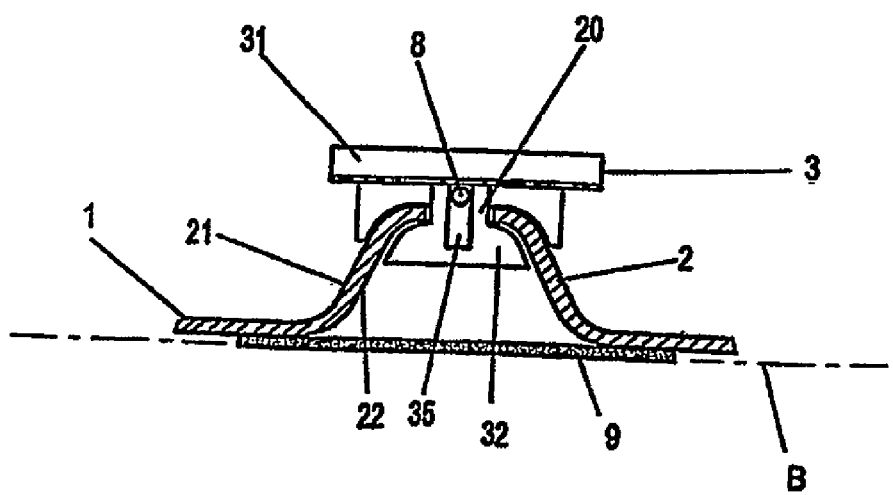
Figure 3:
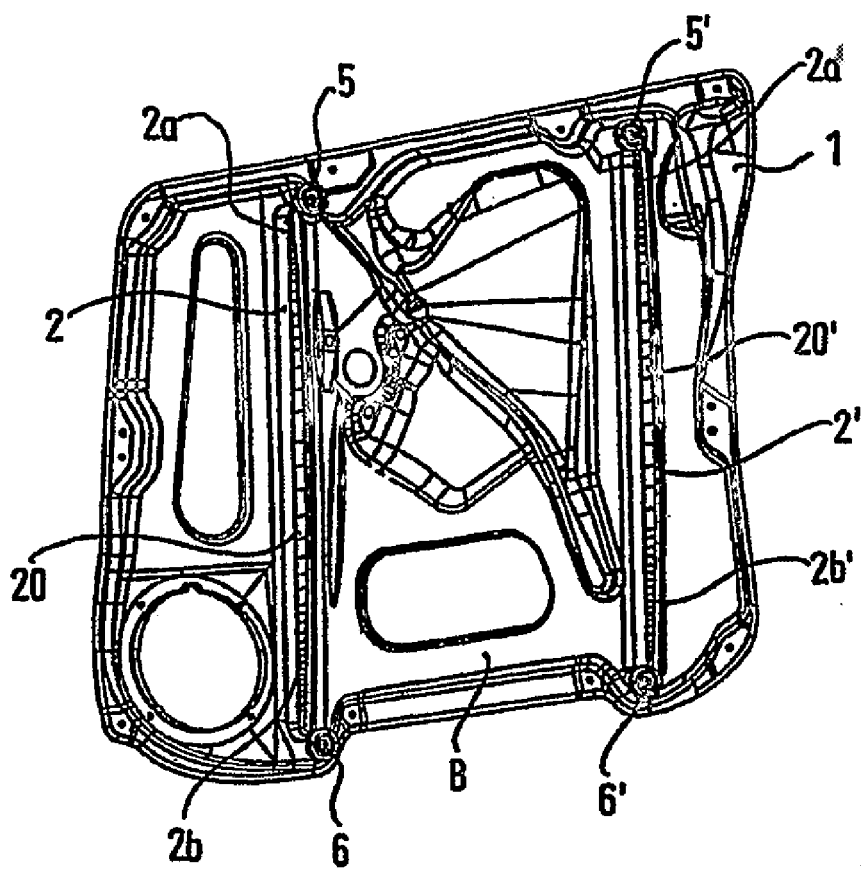
Figure 5:
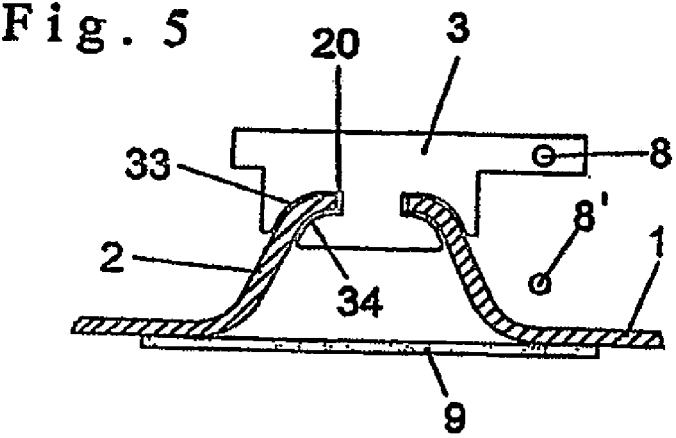
Figure 6:
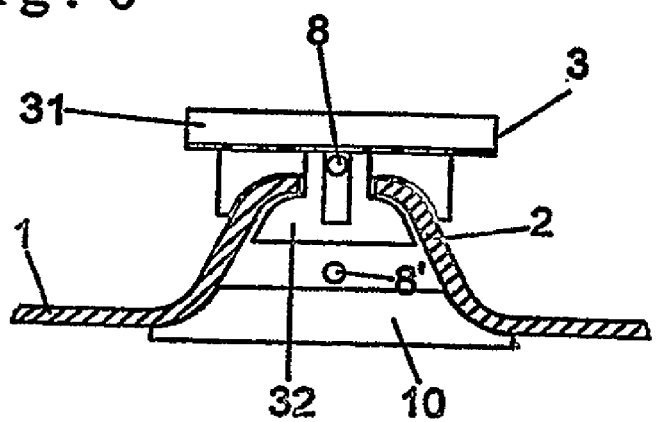
Figure 7:
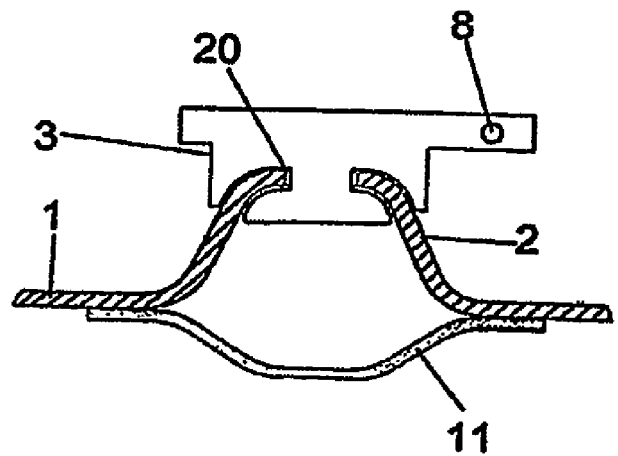
Figure 10:
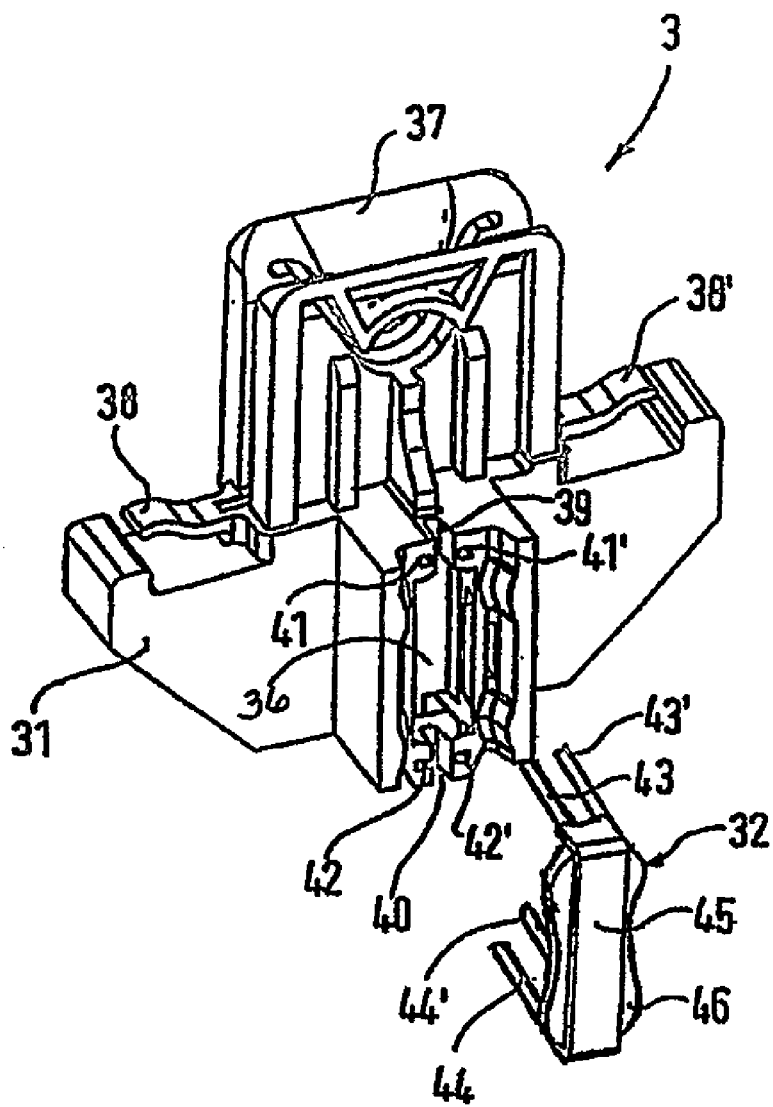

FIG. 8 shows a guide rail 2 shaped out from the base surface of a carrier plate 1 and having side grooves 21, 22 which adjoin the base surface of the carrier plate 1. A cover 12 having side projections 121, 122 corresponding to these grooves 21, 22 is inserted into said grooves 21, 22. The carrier plate 1–1''' can also be coupled to the cover 12'–12''' by grooves, slots, or hooks 21'–21''' on the carrier plate, as shown schematically in FIGS. 12–14. The stable embodiment of the cover 12 in connection with a cable guide 123 arranged in the region of the window lifter cable 8 produces an extremely stable cover for separating the wet and dry space while at the same time guiding the window lifter cable 8. The carrier 3 can be selectively formed in one or two parts according to the previous embodiments and the one-piece embodiment of a carrier according to FIGS. 9a–9c.

Figure 9A:
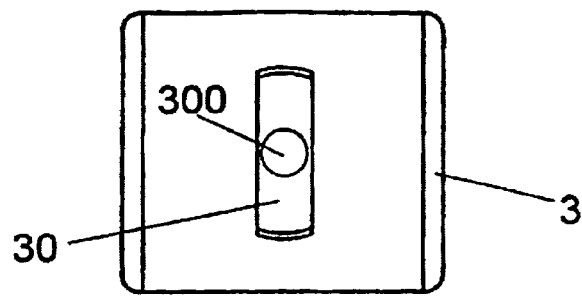
FIG. 9a shows a side view through a shaped guide rail and a carrier in a first phase of the connection between the carrier and the guide rail.

FIG. 9a shows a side view of a one-piece carrier 3 having an oblong fixing and slide region 30 which is connected through a cylindrical through-axis 300 to the part of the carrier 3 bearing against the outside of the guide rail 2.

Figure 9B:
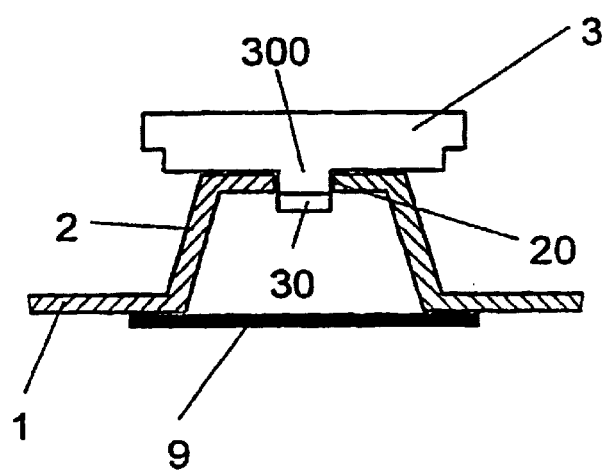
FIG. 9b shows a cross-sectional view of one embodiment through a shaped guide rail and a carrier in a first phase of the connection between the carrier and the guide rail.

As seen in FIG. 9b, this one-piece carrier 3 is inserted from outside of the guide rail 2 into the slot 20 of the guide rail, with the fixing and slide region 30 aligning with the slot 20 of the guide rail 2.

Figure 9C:
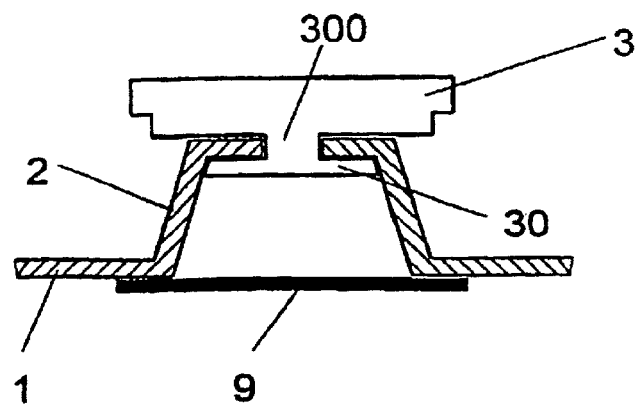
FIG. 9c shows a cross-sectional view of the embodiment shown in FIG. 9b, through a shaped guide rail and a carrier in a second phase of the connection between the carrier and the guide rail.

By turning the one-piece carrier 3 about 90 degrees as shown in FIG. 9c, the oblong fixing and slide region 30 moves against the inside of the guide rail 2 thereby establishing a keyed connection between the carrier 3 and the guide rail 2 shaped out from the base surface of the carrier plate 1 while maintaining the longitudinal displaceability of the carrier 3 relative to the longitudinal extension of the guide rail 2.

For the cover it is possible to use one of the covers described above, for example an adhesive strip or a flat foil 9 which is placed on and then connected to the edges of the guide rail 2 shaped out from the base surface of the carrier plate 1

Figure 10:
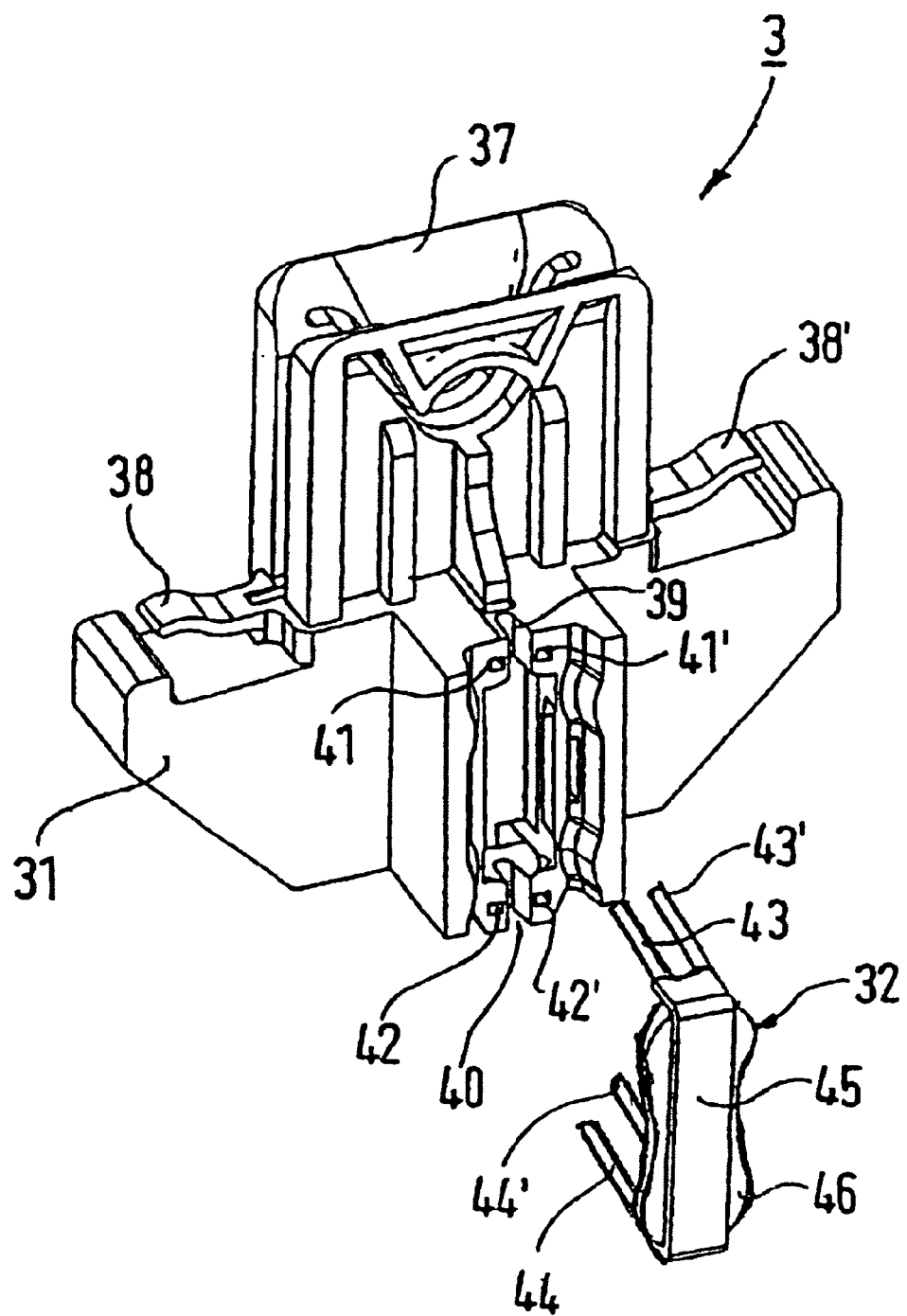
FIG. 10 shows a perspective view through a two-part carrier prior to connection of the two carrier parts.
Figure 11:
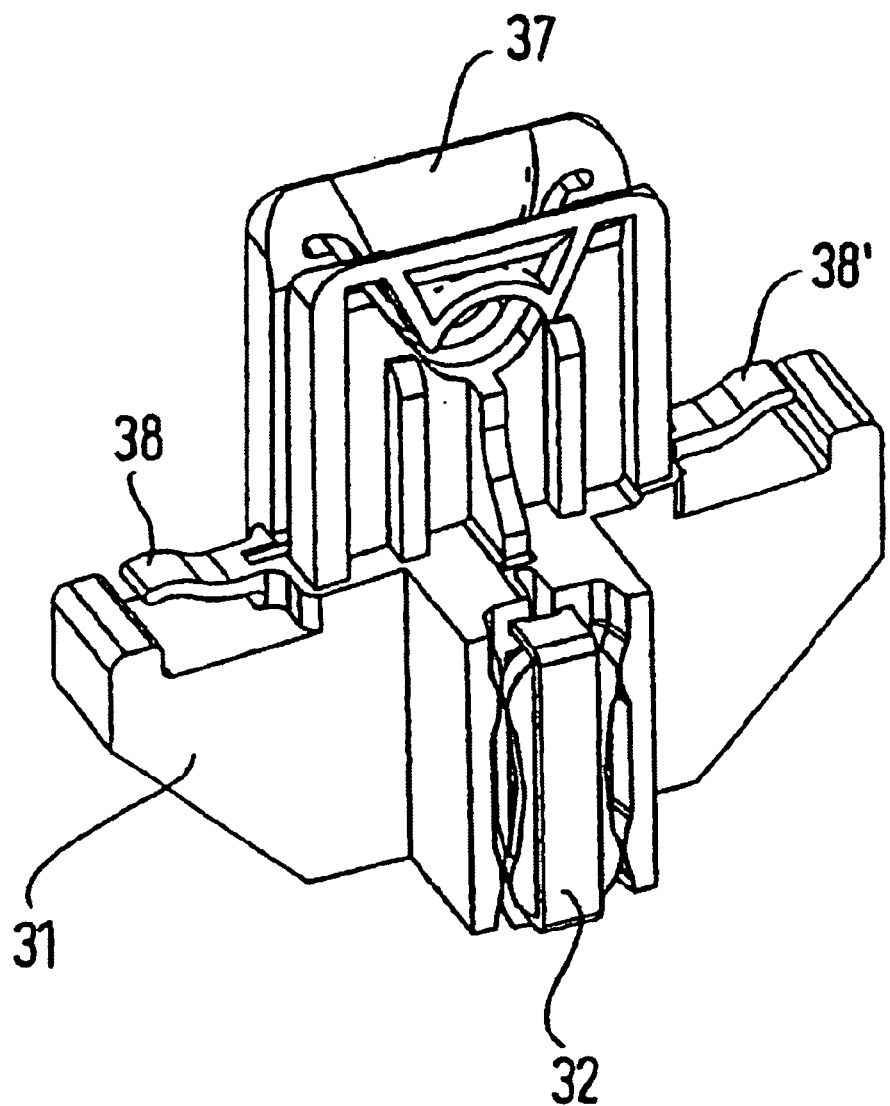
FIG. 11 shows the two-part carrier according to FIG. 10 in the assembled state.

FIGS. 10 and 11 show an embodiment of a two-piece carrier before and after the connection of the two constituent parts, which is particularly suitable for connecting with a guide rail 2, 2' shaped in the manner described above from the base surface of the carrier plate 1.

The carrier 3 has a window pane socket 37 in which a window pane is inserted and connected to the carrier 3. To compensate tilting movements in the window pane resilient tongues 38, 38' are provided on the underneath of the window pane socket 37. The carrier base body 31 of the two-part carrier 3 has a cable nipple chamber 36 along which runs the dividing line between the carrier base body 31 and a counter member 32, i.e. the two parts 31, 32 which make up the two-part carrier 3.

Openings 41, 41' and 42, 42' are provided above and below the cable nipple chamber 36 to hold connecting webs 43, 43'; 44, 44' of the counter member 32 of the carrier 3 which to connect the carrier base body 31 to the counter member 32 engage with detent action in the openings 41, 41' and 42, 42' respectively and which after connecting the counter member 32 to the carrier base body 31 establish by bending or another way a fixed positive keyed connection between the two parts 31, 32 of the two-part carrier 3 after it has been fitted on the guide rail 2, 2' which is shaped out from the base surface of the carrier plate 1.

A cable opening 39, 40 of the cable nipple chamber 36 is provided between the openings 41, 41' and 42, 42' to receive the cable which is connected in the cable nipple chamber 36 fixedly to the carrier 3 for example through the arrangement of a shaped member fixed on the cable.

The counter member 32 of the carrier 3 preferably consists of a sheet metal angle plate 45 with angled connecting webs 43, 43' and 44, 44' as well as a plastics insert 46 which in the assembled state of the carrier 3 illustrated in FIG. 11 bears against the inside of the guide rail (not shown), which is shaped out from the base surface of the carrier plate (not shown).

What is claimed is:

1. A window lifter for motor vehicles comprising:
    a carrier plate adapted to seal a dry side of a vehicle door from a wet side of the vehicle door and having a base surface and a protruding surface, the protruding surface shaped as at least one guide rail with a longitudinally aligned slot;
    at least one carrier holding a window pane and displaceable along the at least one guide rail, wherein the at least one carrier bears at least in part against an outside and an inside of the at least one guide rail and extends through the slot;
    reversing devices mounted at end regions of the at least one guide rail;
    a cable in active connection with the at least one carrier and with a drive device, the cable guided over the reversing devices; and
    wherein the inside of the at least one guide rail is provided with a cover that substantially seals the inside of the guide rail against moisture.

2. The window lifter according to claim 1 wherein the cover is flat and is mounted in a plane of at least one of the base surface of the carrier plate and the inside of the at least one guide rail.

3. The window lifter according to claim 1 wherein the cover comprises a permanent adhesive strip.

4. The window lifter according to claim 1 wherein the cover comprises a shaped part inserted into the inside of the at least one guide rail.

5. The window lifter according to claim 4 wherein the shaped part comprises a molded plastics part.

6. The window lifter according to claim 1 wherein the cover comprises a shaped member connected to the carrier plate and resting on edges of the carrier plate which adjoin the at least one guide rail.

7. The window lifter according to claim 1, wherein the cover comprises a shaped member which can be one of inserted into grooves of the at least one guide rail and coupled to the carrier plate in at least one of grooves, slots and hooks on the carrier plate, and wherein the cover has a cable socket for guiding the cable.

8. The window lifter according to claim 1 wherein the at least one carrier is formed in two parts and a first part of the at least one carrier bears against the outside of the at least one guide rail and a second part bears against the inside of the at least one guide rail.

9. The window lifter according to claim 8 wherein the at least one carrier is divided in a region of a cable nipple chamber and has openings above and below the cable nipple chamber for holding a counter member which forms the second part of the at least one carrier.

10. The window lifter according to claim 9 wherein the counter member is made from sheet metal bent at an angle and a plastics insert.

11. The window lifter according to claim 1 wherein the at least one carrier is formed in one piece, a part of the at least one carrier that bears against the outside of the at least one guide rail is connected to the cable and a part of the carrier that bears against the inside of the guide rail is shaped so that the carrier can be inserted in the slot of the at least one guide rail and can be connected with keyed engagement with the at least one guide rail whilst displaceable in a longitudinal direction of the at least one guide rail.

12. The window lifter according to claim 11 wherein the cable is connected eccentrically to the at least one carrier.

13. The window lifter according to claim 12 wherein the cable is connected to the at least one carrier outside of a guide surface of the at least one guide rail.

14. The window lifter according to claim 1 wherein the at least one carrier is formed in one piece and has a longitudinal fixing and slide region which is shaped such that after pushing the region through the slot of the at least one guide rail and turning the region, the at least one carrier bears on the outside and inside of the at least one guide rail and against edges of the at least one guide rail, which edges adjoin the slot.

15. The window lifter according to claim 1 wherein the cable is connected centrally, relative to the at least one carrier, to a cable nipple chamber of the carrier.

16. The window lifter according to claim 1, wherein the carrier plate is curved, and the cable running between the reversing devices does not intersect the base surface of the carrier plate.

17. The window lifter according to claim 1 wherein the carrier plate is curved, and the cable running between the reversing devices at least partially intersects the base surface of the carrier plate and the cover is formed so that it does not contact the cable at any point.

18. The window lifter according to claim 1 wherein the end regions of the at least one guide rail are formed as ramps.

19. The window lifter according to claim 1 wherein the at least one guide rail is curved in a longitudinal direction relative to the base surface of the carrier plate.

20. The window lifter according to claim 1 wherein the carrier plate is provided with at least one of the group consisting of guide slots and guide elements shaped out of the base surface of the carrier plate which are adapted to hold at least one of the group consisting of slide elements and fixing elements connected to structural parts of the vehicle door.

21. The window lifter according to claim 1 wherein an imprint of the at least one guide rail is formed by at least one of the group consisting of deep drawing the carrier plate, stamping the carrier plate, injection moulding the carrier plate, and thermoforming the carrier plate.

22. The window lifter according to claim 1 wherein side edges of the carrier plate are adapted to be connectedly sealed against moisture to a carrier plate socket of the vehicle door.

* * * * *

UNITED STATES PATENT AND TRADEMARK OFFICE
CERTIFICATE OF CORRECTION

| | |
|---|---|
| PATENT NO. | : 6,874,279 B1 |
| APPLICATION NO. | : 10/088450 |
| DATED | : April 5, 2005 |
| INVENTOR(S) | : Weber et al. |

It is certified that error appears in the above-identified patent and that said Letters Patent is hereby corrected as shown below:

In the Drawings

| | |
|---|---|
| FIG. 4, Sheet 1 of 11 | Delete Drawing Sheet 1 and substitute therefore the Drawing Sheet, consisting of Figs. 1 and 4, as shown on the attached page |
| FIG. 3, Sheet 3 of 11 | Delete Drawing Sheet 3 and substitute therefore the Drawing Sheet, consisting of Fig. 3, as shown on the attached page |
| FIGs. 5-7, Sheet 4 of 11 | Delete Drawing Sheet 4 and substitute therefore the Drawing Sheet, consisting of Figs. 5-7, as shown on the attached page |
| FIG. 10, Sheet 7 of 11 | Delete Drawing Sheet 7 and substittue therefore the Drawing Sheet, consisting of Fig. 10, as shown on the attached page |

In the Claims

| | |
|---|---|
| Column 9, line 5, Claim 5 | Delete "plastics", Insert --plastic-- |
| Column 9, line 28, Claim 10 | Delete "plastics", Insert --plastic-- |
| Column 9, line 36, Claim 11 | Delete "whilst", Insert --while-- |

UNITED STATES PATENT AND TRADEMARK OFFICE
CERTIFICATE OF CORRECTION

PATENT NO. : 6,874,279 B1
APPLICATION NO. : 10/088450
DATED : April 5, 2005
INVENTOR(S) : Weber et al.

It is certified that error appears in the above-identified patent and that said Letters Patent is hereby corrected as shown below:

Column 10, line 35, Claim 21   Delete "moulding",
                                Insert --molding--

Signed and Sealed this

Twentieth Day of February, 2007

JON W. DUDAS
*Director of the United States Patent and Trademark Office*